United States Patent [19]

Lewis

[11] Patent Number: 5,464,946

[45] Date of Patent: Nov. 7, 1995

[54] SYSTEM AND APPARATUS FOR INTERACTIVE MULTIMEDIA ENTERTAINMENT

[75] Inventor: Scott W. Lewis, San Jose, Calif.

[73] Assignee: Multimedia Systems Corporation, San Jose, Calif.

[21] Appl. No.: 977,033

[22] Filed: Feb. 11, 1993

[51] Int. Cl.⁶ .............................. G09B 15/02; G10H 1/26
[52] U.S. Cl. .............................. 84/609; 84/645; 84/477 R
[58] Field of Search .............. 84/601, 602, 609–614, 84/634–638, 645, 477 R, 478, DIG. 6

[56] References Cited

U.S. PATENT DOCUMENTS

| | | | |
|---|---|---|---|
| 1,213,804 | 1/1917 | Cahill | 84/671 |
| 5,194,682 | 3/1993 | Okamura et al. | 84/645 X |
| 5,247,126 | 9/1993 | Okamura et al. | 84/645 X |
| 5,250,747 | 10/1993 | Tsumura | 84/645 |
| 5,296,643 | 3/1994 | Kuo et al. | 84/610 |

*Primary Examiner*—Stanley J. Witkowski
*Attorney, Agent, or Firm*—Benman Collins & Sawyer

[57] ABSTRACT

A system for interactive multimedia entertainment that stores a plurality of video and/or songs and allows for the receipt of information concerning the cost of each song and other relevant information. The system has application to music listening, video entertainment and Karaoke entertainment systems.

29 Claims, 11 Drawing Sheets

SYSTEM AND APPARATUS FOR INTERACTIVE MULTIMEDIA ENTERTAINMENT

FIELD OF THE INVENTION

The present invention relates to an interactive multimedia system and more particularly to a system for the interactive multimedia entertainment.

BACKGROUND OF THE INVENTION

The entertainment industry has become more diverse over time. With the advent of music video entertainment, the ability to dub in different information and provide a facility for the viewer or the listener to actively engage with the entertainment is now more available. There have been new technologies that have been developed as a result of the music entertainment. For example, Karaoke is very popular in Asia. In Karaoke individuals listen to music and read the words on a screen, watch the lyrics and sing along. It is of equal interest that many people are doing these same things within the confines of their home.

Karaoke entertainment involves participants which sing to a popular song in which the main vocal track has been removed. Many forms of Karaoke can exist including audio tape only Karaoke in which participant uses a script or memory for the lyric words, CD-ROM Karaoke which uses still or non-unique video off the CD-ROM to provide entertainment for the non-singing participants and color changing lyric words to aid the singing participant, and laser disk Karaoke containing unique video along with color changing lyrics. Typically such systems can change pitch but only by changing the speed of the song's play back, since the audio is inherently analog or streaming digital based information which is not buffered in any way. Revenue is generated either through admission fees collected from Karaoke bar or booth patrons or from purchases of disk or tape products at record or Karaoke shops.

Many draw backs exist which make multimedia music entertainment more difficult to enjoy or more costly to obtain. In music listening entertainment, for example, it is impossible to judge a song until it is aired and heard, with many songs on a given record never given air time. In music video entertainment air time is even more restricted since there are only a small number of cable channels devoted to music video entertainment. Both of these areas would gain immensely from an interactive system of access; they would gain even more entertainment value if creative participant interactivity could be added. The present invention addresses both of these points.

Several specific draw backs exist with existing techniques of Karaoke entertainment. First, often the medium of tape, CD-ROM disks, or laser disks require a purchaser to buy one tape or disk that contains a dozen songs although only one or two are of interest. Second, though some songs are used by purchasers many times, in the case of Karaoke bar, booth, or personal entertainment purposes it is common to use a given song only once or twice over a year, thus increasing the effective cost of the entertainment. Third, though there are thousands of Karaoke song titles, normal record stores or even Karaoke stores only carry a small proportion of the total produced titles. A last disadvantage of existing Karaoke systems is that they have only been used for one track of the full piece, the vocals; the present invention addresses all of the above-mentioned points.

SUMMARY OF THE INVENTION

The present invention is directed to a method and apparatus for interactive multimedia entertainment.

In a first facet, an interactive music listening entertainment system comprises means for storing a plurality of songs; means for selecting one of the plurality of songs from the storing means; and means responsive to the selecting means for receiving the one song from the storing means by a recipient; the receiving means also receiving information concerning the cost of the one song from the storing means and including means for limiting the number of plays for the one song.

In a second facet, an interactive multimedia video entertainment system comprises means for storing a plurality of songs and video information related to the plurality of songs; means for selecting a song and its associated video information from the storing means; and means responsive to the selecting means for receiving the one song and its associated video information, the receiving means also for receiving information concerning the cost of the one song and its associated video information from the storing means and for counting the number of times the one song is played and charging the recipient a particular price per play.

In yet a third facet, an interactive multimedia karaoke system comprises means for storing multimedia information to allow for the production of a video and audio presentation; means for selecting a particular set of multimedia information from the storing means; and means responsive to the selecting means for receiving the particular set of multimedia information and for modifying the particular set of multimedia information so as enhance the quality and interactivity of the particular set of multimedia information.

DETAILED DESCRIPTION OF THE INVENTION

The present invention relates to an improvement in interactive multimedia entertainment systems. The following description is presented to enable one of ordinary skill in the art to make and use the invention and is provided in the context of a patent application and its requirements. Various modifications to the preferred embodiment will be readily apparent to those skilled in the art and the generic principles and features described herein.

Figure 1:
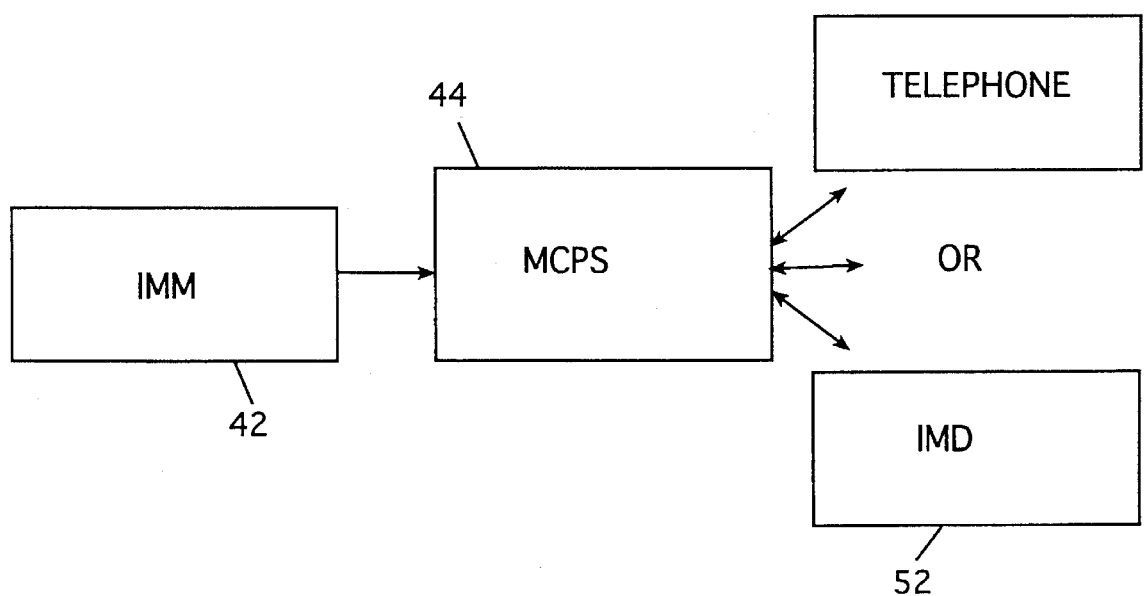
FIG. 1 is an interactive multimedia system utilized for music listening entertainment.

Referring now to FIG. 1, what is shown is an interactive music listening entertainment system. The music listening entertainment system 10 comprises an interactive multimedia mastering system (IMM) 42 which receives the program source material as in the songs or records of CD quality provided through a multimedia call processing system (MCPS) 44 which in turn is activated by a telephone and is also connected to an interactive multimedia device (IMD) 52.

The (IMD) 52 in this situation would be capable of providing for storage of certain songs which could be played on a stereo or the like. This type of system the IMD 52 could provide a CD quality song which can be transmitted over the network. The MCPS 44 can take credit or order information and can ship an IMD 52 song over the network or can indicate that a CD should be shipped in the mail. In the present invention the IMD 52 will limit the number of times the song can be played by encoding the song in a particular way when it is sent and also can provide for a charge for each time a particular song is played. In addition, the system would have the capability to make a personalized album. For example, if the recipient of a particular song wanted to record it directly from the IMM, he/she could send a signal down to the IMM 42 via the IMD 52. The IMM 42 would then provide a high quality audio song to be recorded.

Figure 2A:
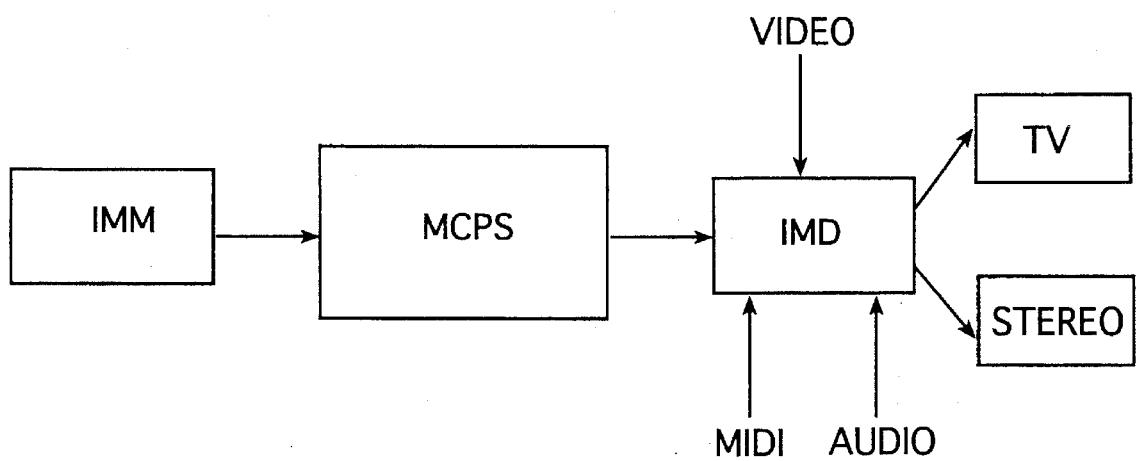
FIG. 2A is an interactive multimedia system for video entertainment.

FIG. 2A shows an embodiment of a music video entertainment system 20. Much like the previously mentioned music listening entertainment system an IMM 42 provides enhanced music to a MCPS 44. In addition, program source material for video is provided to the IMD 52 from another source (not shown). The IMD 52 would be utilized to send information to a TV 32 and/or stereo 34 related to audio, MIDI, instruments and the like. In this embodiment, multimedia information can be sent down a network such as stills, motion, lyrics, score and synchronized with the playback. Additionally one or all of the music video tracks can be substituted by an actual audio or MIDI instrument input. This would allow a person to play as a member of the band for entertainment or learning depending upon the graphics display which can include a section with the current music rotation score with color changes to highlight the current position of the guidance of the accompanying musician. In addition, the tempo and pitch can be adjusted to the control of data generated from the IMD 52. Multimedia information could also be keyed by type or generated to provide a video overlay.

Figure 2B:
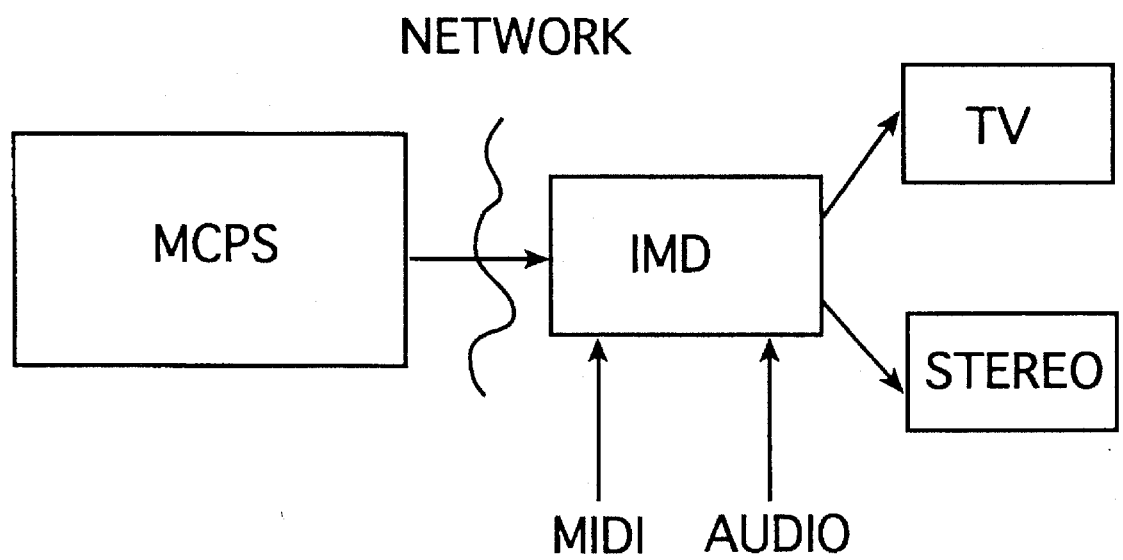
FIG. 2B is an interactive multimedia system for Karaoke entertainment.

FIG. 2B is a simple block diagram of a Karaoke entertainment system 30. Once again this system includes an IMM 42 which with the IMD 52, a CD quality song can be transmitted to the TV 32 and the stereo 34. Psycho-graphic information can be displayed such as equalization and dynamic levels. Multimedia information can be sent down a network to the TV 32 such as with stills, motion, lyrics, scores, etc. and synchronized with the playback aspects of the system.

Figure 2C:
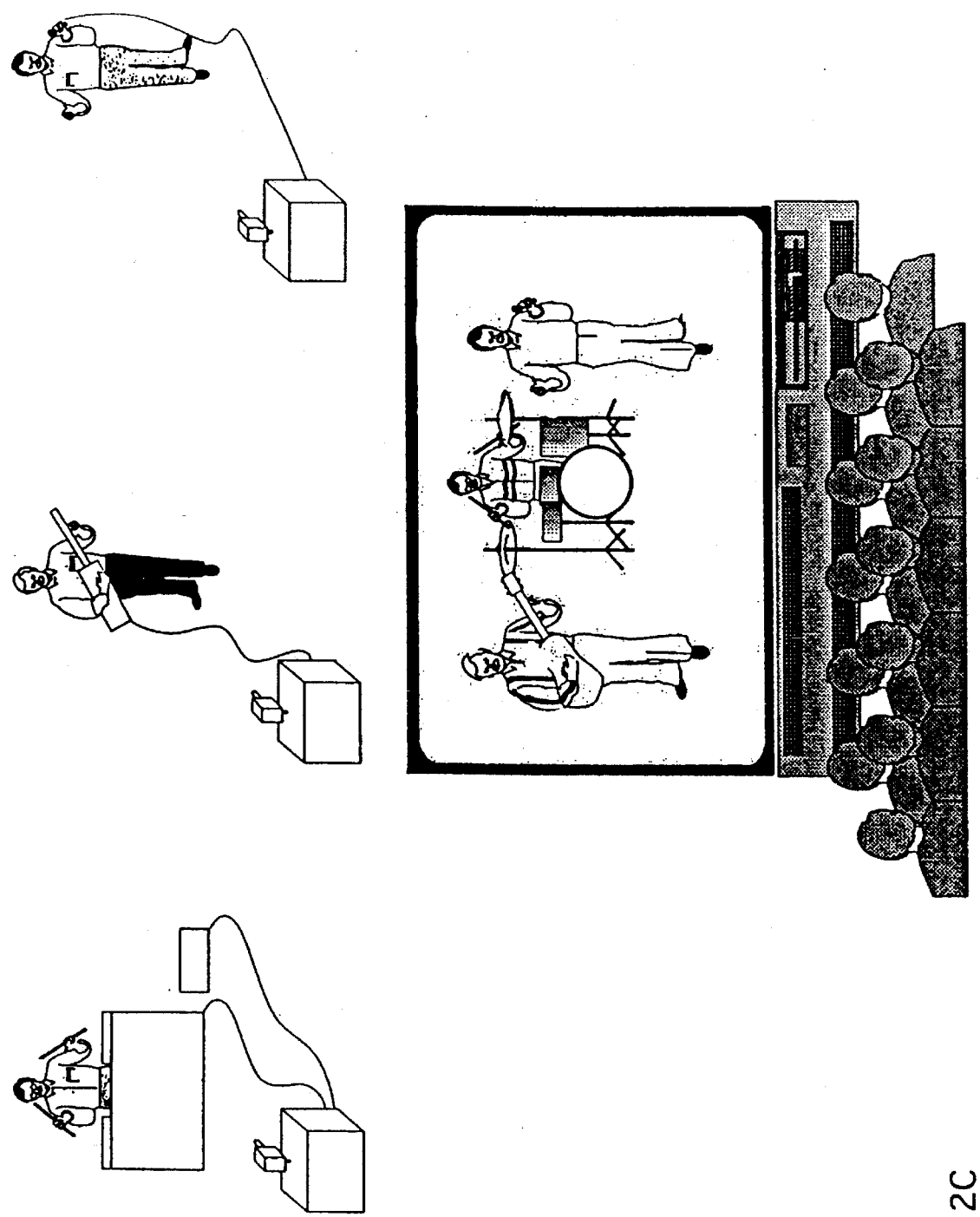
FIG. 2C shows an interactive multimedia Karaoke presentation.

In this system 30 each of a plurality of instruments along with voice (sing-along) can be enhanced via the present invention. To more fully explain this feature refer now to FIG. 2C which depicts a multimedia Karaoke presentation 400 in accordance with the present invention. As is seen in the Figure, one person 402 is holding a microphone 404, has a monitor 406 in front of her, and a video camera 408 is in front of her on top of the monitor 406. A second person 410 has a similar arrangement 410 except he is playing a MIDI drum 412. Yet a third person 414 has a similar video camera/monitor arrangement except he is playing a MIDI guitar 416. All of the individuals 404, 410 and 416 can view the Karaoke entertainment screen via their respective monitors. At the same time the Karaoke presentation can be provided to an audience 450 on a screen 452.

In an arrangement such as this a multimedia presentation of a popular song is introduced, each of the players can have their instruments or voice (as the case may be) substituted for the same tracks in the original song/video. In such an arrangement all of the original tracks (voice, lyrics, drum, guitar and score) can be substituted with the tracks of the entertainment instruments (instruments or voices) of the individuals 404, 410 and 416. Guidance to performers for tempo is provided using the monitors to display portions of the corresponding score for the instrument being played or vocals being sung (drum track, guitar score, voice lyrics) with the position in time being indicated by the track changing color.

In a preferred embodiment each of the tracks can be further enhanced by incorporating interactive video sources from the different performers using a key video color keying technique for each performers video source. The scene viewed by the audience may be in one embodiment, the heads of the individual performers on the bodies of the people in the actual video having used the performers video sources as identified by the color key mastered in the video as a substitute for the original video material. In so doing many of the enhancements and the like which will hereinafter be described can be performed to make the performance as realistic as possible.

In all of the above described embodiments an IMM 42 is critical to providing some interactive activity of the program. To more fully describe this optimization technique refer now to FIG. 3 which is a block diagram of an optimization method in accordance with the present invention. The systems 10 and 20 as above-mentioned include an IMM 42 that provides much of the optimization of the program source material for presentation to MCPS 44.

Figure 3:
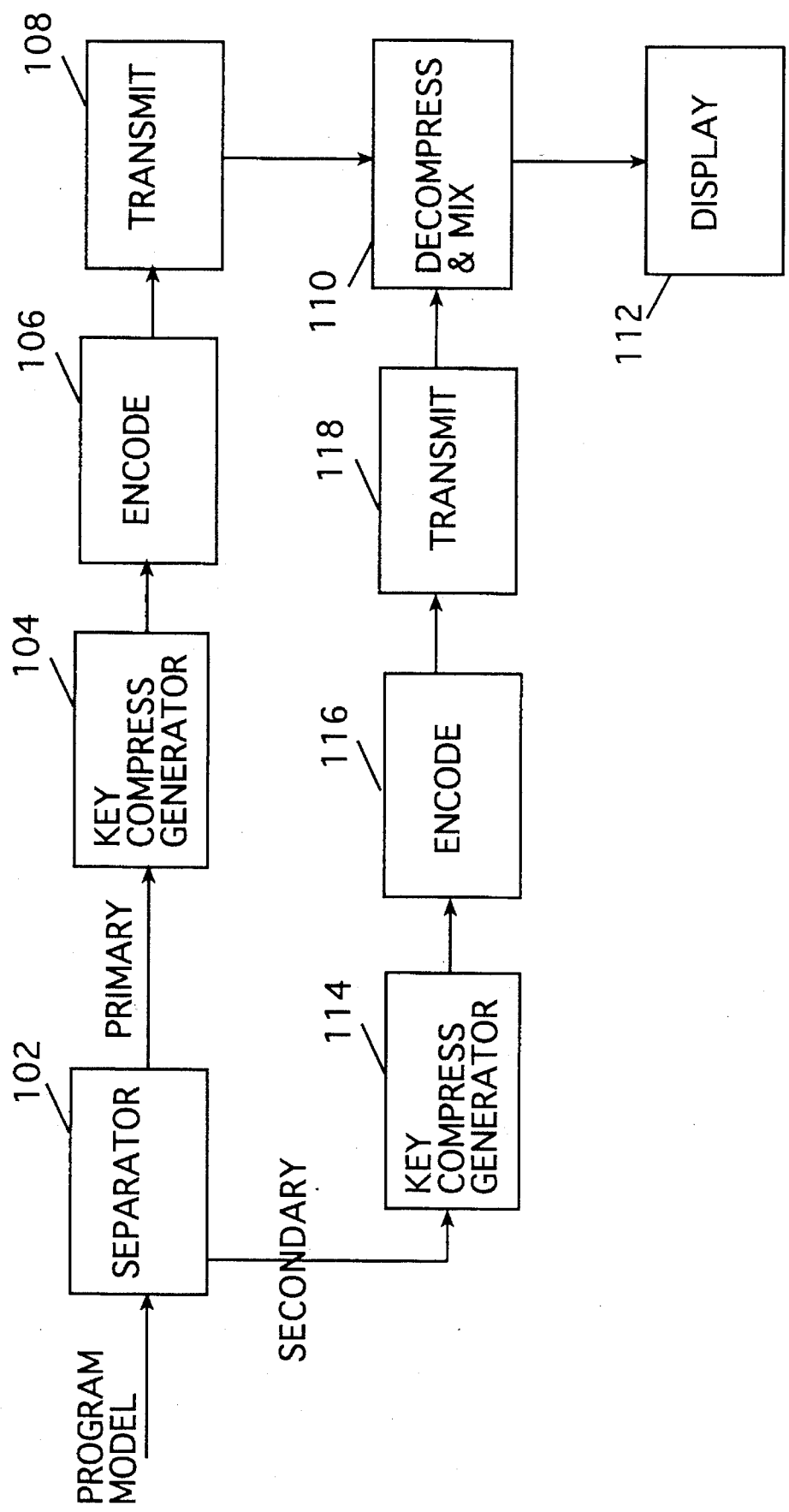
FIG. 3 is a flow chart of a first embodiment of the optimization method which is utilized in a network in accordance with the present invention.

To more specifically describe this optimization technique, refer now to FIG. 3 which is a block diagram of an optimization method in accordance with the present invention. This optimization technique has been described in detail in U.S. patent application No. 07/976,941, entitled, "*Method for the Production and Transmission of Enhanced Multimedia Information*", having a filing date of Nov. 16, 1992, assigned to the assignee in the present invention, and that patent application is incorporated by reference in this application. The following paragraphs along with the accompanying figures will provide the details regarding the optimization method and how it will be used advantageously to provide an enhanced interactive multimedia system.

The purpose of the IMM 42 is to provide maximum interactivity while at the same time providing maximum retention of the program model. It is also important that there be minimum transit time for the interactivity while the information has maximum replication. Therefore, it is very important that the program model psychographic parameters be well described. For example, the spatial, color, temporal, audio response, material concept, contention perception all should be very well described and defined in the program model.

Referring again to FIG. 3 what is shown is a first embodiment of a flow chart for providing an enhanced interactive image that utilizes the principles of the present invention. The flow chart 100 comprises the steps of providing a program model to a separator. The separator 102 will divide the information into primary and secondary layers of interactive multimedia information. The separation is automatic and can be accomplished in a variety of ways. For example, the layers can be separated by production sources. In another example, separation can be accomplished through key coding the layers. In yet a third example, the layers can be spatially separated or separated by the various colors. Finally, layers of information could be separated by a filtering process.

The primary layers are provided to the compression generation block 104. There are a variety of ways that the multimedia data can be changed or generated to use less bandwidth. For example, compression algorithms or their equivalents could be utilized to reduce the bandwidth used. In addition generators, such as in a tone generator system, could be utilized to reduce the bandwidth required. Finally, key coding systems could be utilized to reduce bandwidth use. Such systems will be discussed in more detail later in the specification.

In this embodiment, the primary layer is provided to an encoder where the primary layer is prepared for transmission (block 108). The primary layer is then decompressed (block 110). The primary layer is then decoded and mixed with the secondary layer of data information (block 112) to provide an enhanced interactive multimedia image (motion, video or other) or data to a display.

Similarly, the secondary layer is compressed through block 114, encoded (block 116) and then transmitted to block 118 to decompress and mix block 110. The two signals (primary and secondary) are then sent to display 112.

In this embodiment, for example, in the optimization of video images, the primary layer can be the foreground image, the secondary layer can be background information. Through the use of this type of optimization technique multimedia information can be enhanced while at the same time utilizing significantly less bandwidth.

To more fully understand this feature refer now to the following discussion. In a typical interactive multimedia system the information is all sent along one layer. The information that can then be transmitted is limited by the bandwidth of that layer.

In the prior art, the interactive multimedia information that could be transmitted along typical networks or transmission paths that are very limited because, for example, in the case of video images the bandwidth is not adequate to provide a high quality image to a display.

Hence, in the present invention, by separating the multimedia information into primary and secondary layers and thereafter compressing the more important information utilizing well known compression algorithms, a system is described that can produce enhanced interactive multimedia information that easily be transmitted over existing networks.

Figure 4:
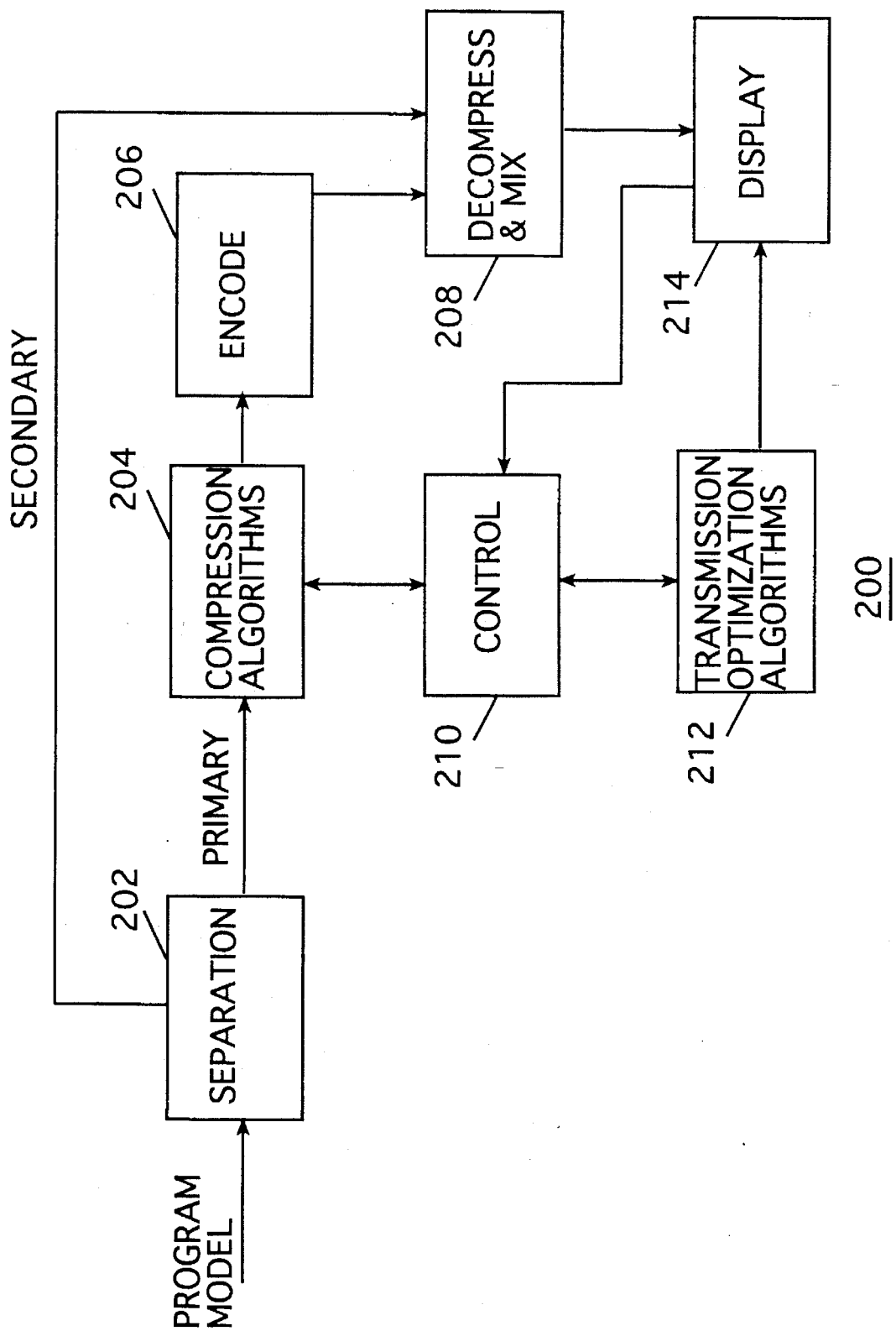
FIG. 4 is a flow chart showing the operation of a second embodiment of an optimization method which is utilized in a network in accordance with the present invention in which a matrix of compression and transmission algorithms are utilized.

To more fully describe the psychographic enhancement feature of the present invention refer now to FIG. 4 which shown the various possibilities from a particular program model. The program model is provided to the separator 42 of the multimedia system.

Psychographic enhancements are critical to the improvement in interactive multimedia transmission and reception enhancements, and in the context of the present application is information that is not transmitted but operates on, operates in conjunction with, or operates as a supplement to transmitted multimedia information. There are three separate categories that will be described that relate to psychographic enhancements.

The first category will be described as a cross correlation between the information that is being transmitted and being enhanced due to the presence of information that is not transmitted. Dithering of image is an example of this in that dithering masks artifacts of images that are present and that improves the image quality. This type of system does not remove the artifacts but actually just masks imperfections. A second example in the audio arena where secondary audio materials such as a sound of an ocean or the like which might mask problems in the audio quality of the primary sound (voice, music or the like).

The second category is where the signal is actually changed without the use of any control signal; for example, through interpolation or some other technique. The typical example of that is a graphic equalizer in which certain frequencies are enhanced depending on the range of the particular device. Another example of the second category is to frequency or amplitude compress a certain signal so as to further enhance the frequencies that are being transmitted. It is also known to use various filters to sharpen or provide certain information that will actually modify the signal without controlling it per se.

Finally, the third category is using the primary and secondary information to drive the other generators that might be present within the multimedia system. This can be utilized to either enhance the multimedia information or enhance the program model. An example of this is the use of real-time graphics frequency spectrum displays to enhance a music juke box type of program model.

Figure 5:
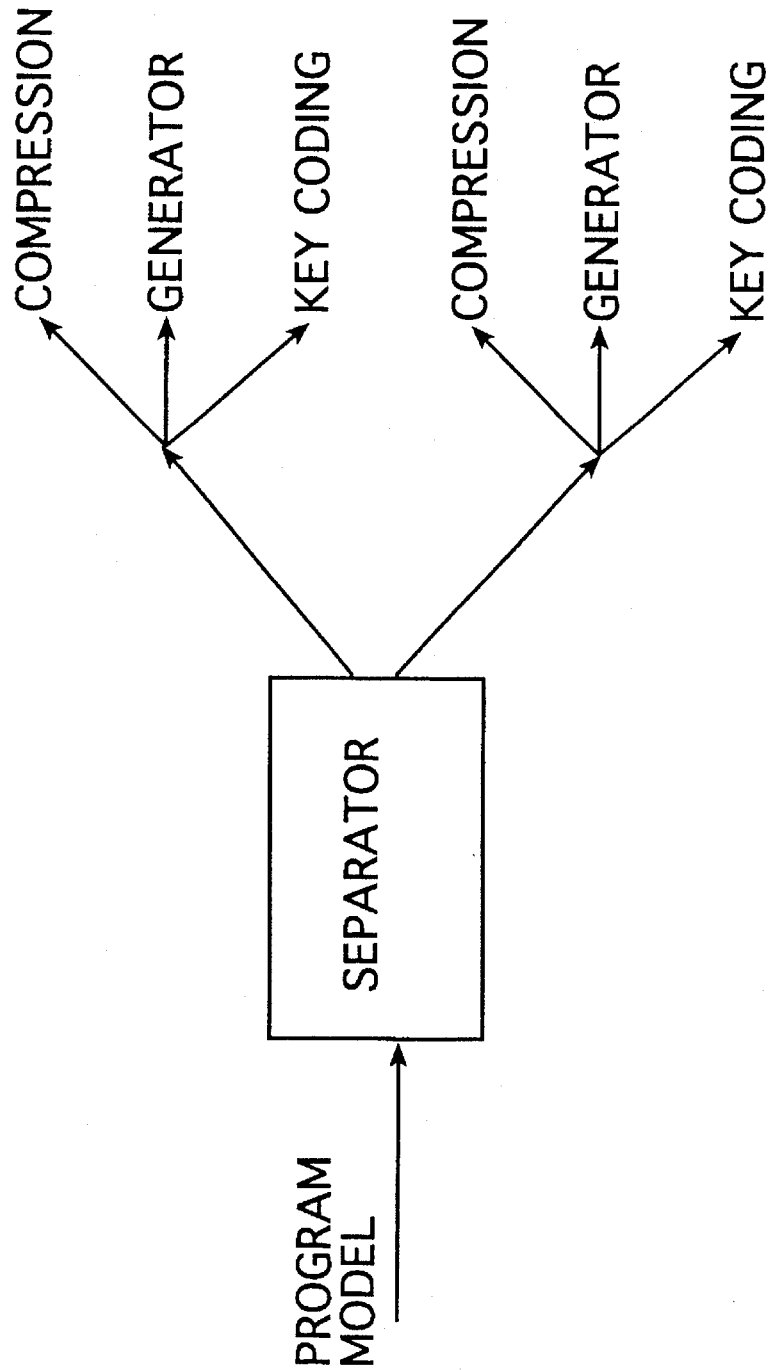
FIG. 5 is a flow chart showing the separation of multimedia information in accordance with the present invention.

As is seen in FIG. 5, the primary multimedia information layer can be compressed to reduce the bandwidth utilizing well known algorithms. It is also seen that the signal can be replaced by a generator that is responsive to the primary/secondary layers signals. Finally, a key code could be used to cause information to be provided from a look-up table or the like.

Although all of the above methods provide advantages in accordance with the present invention, key coding has some additional non-obvious advantages when utilized in the optimization system of the present invention. In the following paragraphs the use of various key coding systems will be described generally along with their attendant advantages.

Typically, when looking at an interactive multimedia information signal there are several components of that information. The first component is the data or the multimedia information itself that is being conveyed. The second component is referred to as program model dynamics. That is the changes that occur in the interactive multimedia information due to for example, a fade that allows for a transition from one scene in the graphics or video image to another. Conversely, if you want to wipe away an image there is information associated with the multimedia data that would call out for that transition to change efficiently.

Finally, the third category of interactive multimedia information is what will be referred to in this specification which will allow a particular device or system to go from one category to another. In a typical interactive multimedia information system all this information is required to adequately transmit such information.

In its simplest form, a key has an identifiable code which dictates the commands on the other side of the device. The clearest example of such a keying system would be the very simple dual tone multi-frequency (DTMF) signal. This type of signal can be used in the telecommunications area to provide keying for low bandwidth protocol. These keys would then command a code table on the side of the network to provide certain information about the multimedia information to be displayed without requiring actual transmission of the multimedia information.

A more specific version of this type of key coding is what will be referred to in this specification as control information keying. What is meant by controlled information keying is where a key code is utilized to access particular types of commands which can then be used to control other items on the other side of the network.

Such a table would then be utilized to access a certain set of multimedia information in the network. A final version of key coding will be called program branching keying and is described by each of the keys representing a certain branch identification. Thus in this type of key coding the key is cross referenced to a particular branch of the interactive multimedia program where each of the branches allows a plurality of functions or commands to be accessed in order to replicate the program model.

The important feature that is provided by all of these types of key coding arrangements is that information already present on the network can be utilized. Therefore, the processing power inherent in the network or the system being accessed can be utilized rather than having to have to provide that processing power within the optimization system itself.

It is also important to develop means to improve the transmission quality of the multimedia information, for example, the information may be transmitted utilizing a typical transmission algorithm such a CCITT v.32, or Bell 202 with standard communication file data transfer protocols. The interactive multimedia information could also utilize specialized protocols that are optimized for the particular interactive multimedia information that is to be transmitted. In so doing the algorithm for the compression algorithm can be interactively matrixed with the transmission algorithm to provide the highest quality information with the maximum interactivity with the minimum transmission line.

Referring now to FIG. 4, what is shown is a flow chart that shows the cooperation of the transmission algorithm with the compression algorithm to produce a high quality multimedia image. The flow chart comprises providing a program model in which the primary and secondary layers are separated (block 202). The primary layer is compressed and encoded (blocks 204 and 206).

A control element (block 210) is utilized to control a compression matrix and a transmission matrix. These two matrices comprise a plurality of compression algorithm and transmission algorithm respectively that are interactively controlled such that as the various algorithms are detected the quality of the multimedia information and the speed of the transmission are interactively determined.

The quality of the information could be determined manually or through the use of some control circuitry. It should be understood that these same matrices could also be used on the secondary layer. It was not shown or described for purposes of clarity and simplicity.

Figure 6:
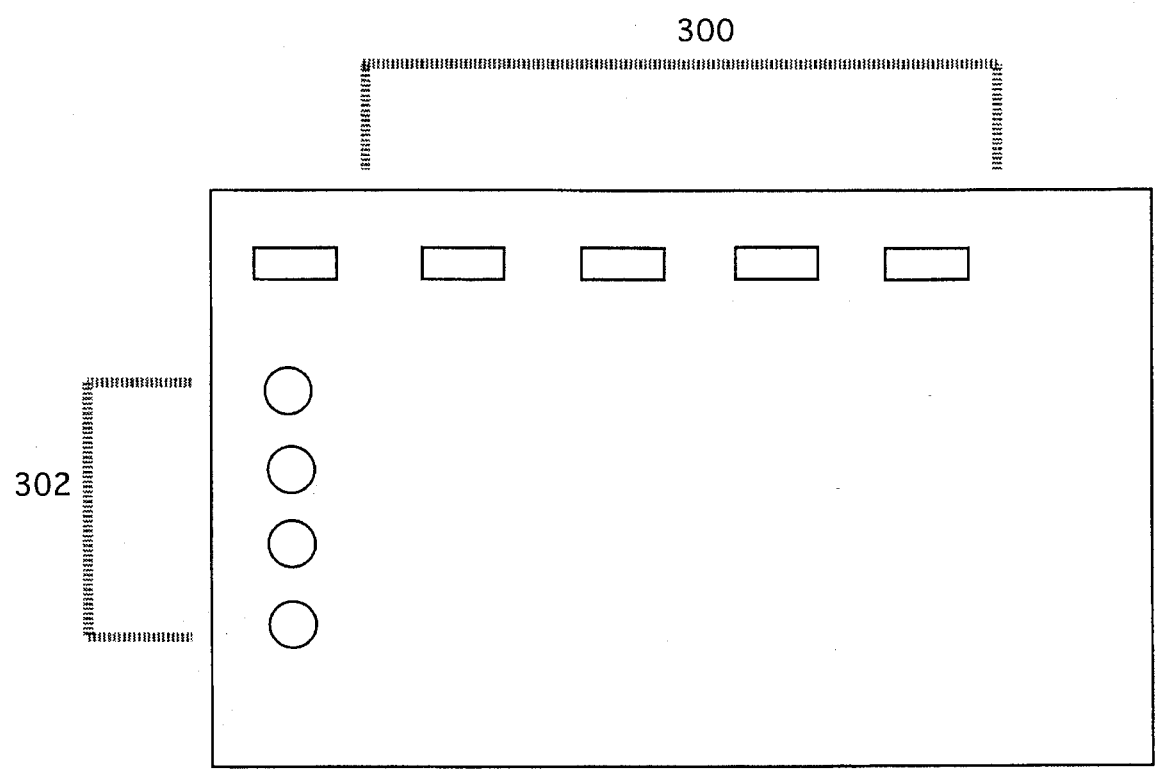
FIG. 6 is a chart showing the cooperation of a compression algorithm with a transmission algorithm in accordance with the present invention.

Referring now to FIG. 6 what is shown is a block representation of a matrix of compression algorithm with transmission algorithm that could be utilized in accordance with the present invention. The circles 302 aligned in the vertical direction are the compression algorithms. The rectangles 304 aligned in the horizontal direction are the transmission algorithms.

For example the compression algorithms could be JPEG and a generator with MIDI. Similarly, the transmission algorithms could be optimized for JPEG, data compression for MIDI, or DTMF for key transmission type algorithms. To provide the highest quality multimedia information while at the same time utilizing minimum bandwidth the different algorithms can be selected in an interactive manner.

Hence, a first compression algorithm could be selected along with the first transmission algorithm. The multimedia information is reviewed either for image or audio quality than a second compression algorithm is selected. The multimedia information is reviewed and if the quality is not acceptable then a second transmission algorithm is selected. The quality of the information is reviewed. This process is repeated until the highest or desired quality multimedia information and interactivity speed are provided.

The multimedia information derived from the compression/transmission algorithms can be analog or digital in nature. However, in a digital signal there are certain other features that can be taken to advantage that can be utilized in accordance with the present invention.

It is known that digital data information is typically sent in a file which specifies certain parameters of that data and the data information itself and within the data information itself is information which may not change for a certain set of files. In the case of an image file, the header information may specify the dimensions, pixel depth, and certain other features of the particular image. This file may take up a much as twenty percent of the data file.

Conversely, in a file such as MIDI music file which comprise a plurality or a series of music notes, the header may include instrument information, related information and characteristics of that particular file. In both of the above mentioned examples, the header information may not change, through the use of the optimization method the amount of information may be significantly reduced over time.

Hence, in the case of the image file, the header could be sent first with no compression or with lossless data compression as the secondary file because it will always remain the same. The date file itself can then be compressed down to its smaller size.

Another method for enhancing the psychographic parameters is to provide some form of error detection and adjustment. As has been mentioned before the detection and adjustment can be accomplished via interpolation of the error. An alternative method of error corrector is through an error correction/transmission algorithm. What is meant by this, is relating the transmission to the compression to enhance interactivity.

In this type of system before the file is sent the base file is compressed and then decompressed. This decompressed file is called an expanded compressed base file. The expanded compressed base file is then compared to the original base file and an error file is then developed (the error file being the difference between the base file and the expanded compressed base file). The error file is compressed and sent along with the compressed version of the base file down the line. These files are then combined and decompressed to provide an enhanced image.

Figure 7:
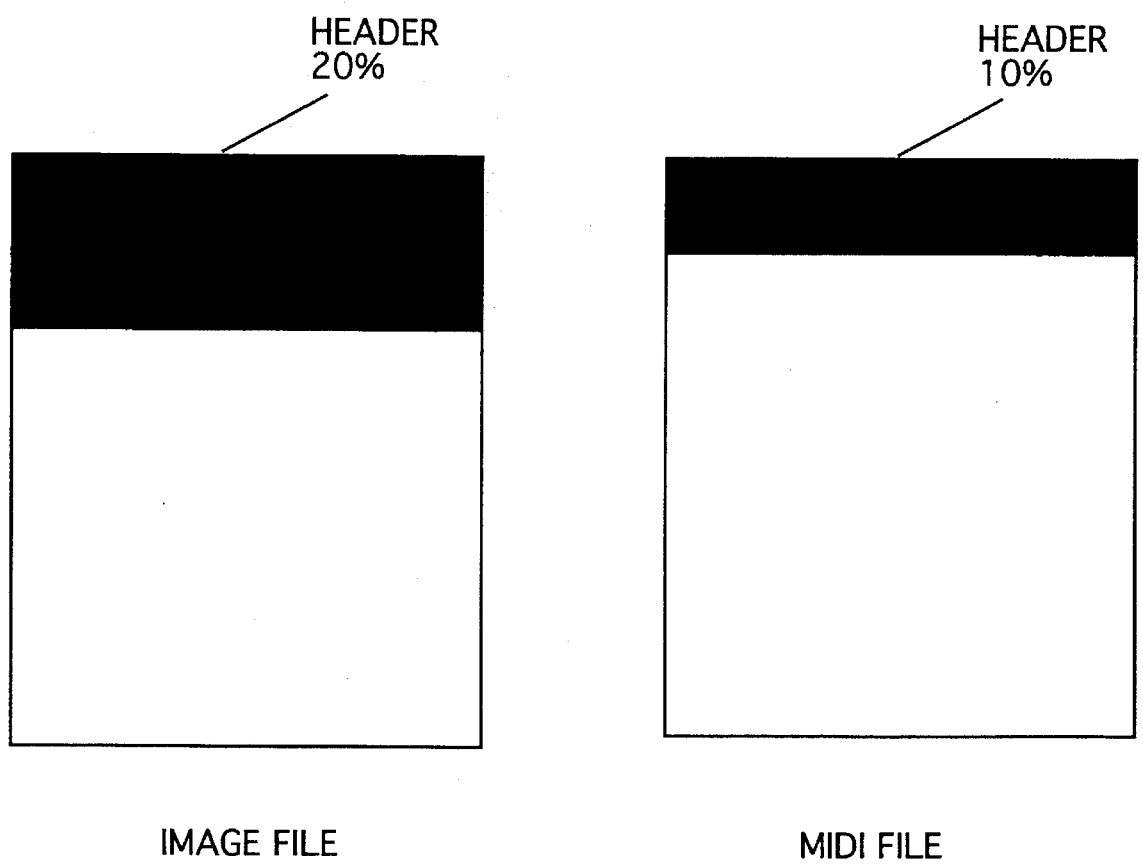
FIG. 7 is a block representation of digital information of an image file and a MIDI file.

Referring now to FIG. 7 it is seen that a data file utilizing this technique could initially be separated into primary and secondary layers. The primary layer could be compressed using a first compression algorithm, the header could be sent first along a first transmission path and the compression signal could be sent along a second transmission path.

Therefore, the amount of storage necessary for the file is significantly reduced through secondary compression techniques. This information can then be transmitted or stored across the network rather than having to have all that information stored within a particular device within the optimization system.

It should be understood by one of ordinary skill in the art will recognize that the number of algorithms is not limited to the number shown in the figures. In addition it should be recognized that the order or the selection of the algorithms could be changed and that would be within the spirit and scope of the present invention.

The present invention has been discussed in terms of compressing the primary layer or layer and by compressing and transmitting that primary layer in a particular way the interactivity of the system is enhanced. It should be understood that it may be equally important to enhance secondary layers to produce the same effect.

Therefore, it may be important to enhance the secondary layer, it may be important to enhance the primary layer or it may be important to enhance both. Therefore, the present invention through the use of compression and transmission algorithms and through the psychographic enhancement of the program model can enhance interactivity of a multimedia system.

It should also be understood that the function of the compression and transmission algorithms can also be done through other means; for example, a signal generator could be used to provide the same information. That is, a signal generator responsive to a particular layer or layer of information could be utilized to provide that information or some level of information that is representative of that layer. For example, a tone generator responsive to a signal from the secondary layer to provide the tone that would be representative of that secondary layer.

Conversely, some type of graphics generator could be utilized to respond to that same type of signal to provide a certain type of graphic image in a video system. Finally, it should also be understood that the psychographic parameters can be adjusted by human operator or in the alternative can be adjusted or modified by an automatic means.

Figure 8:
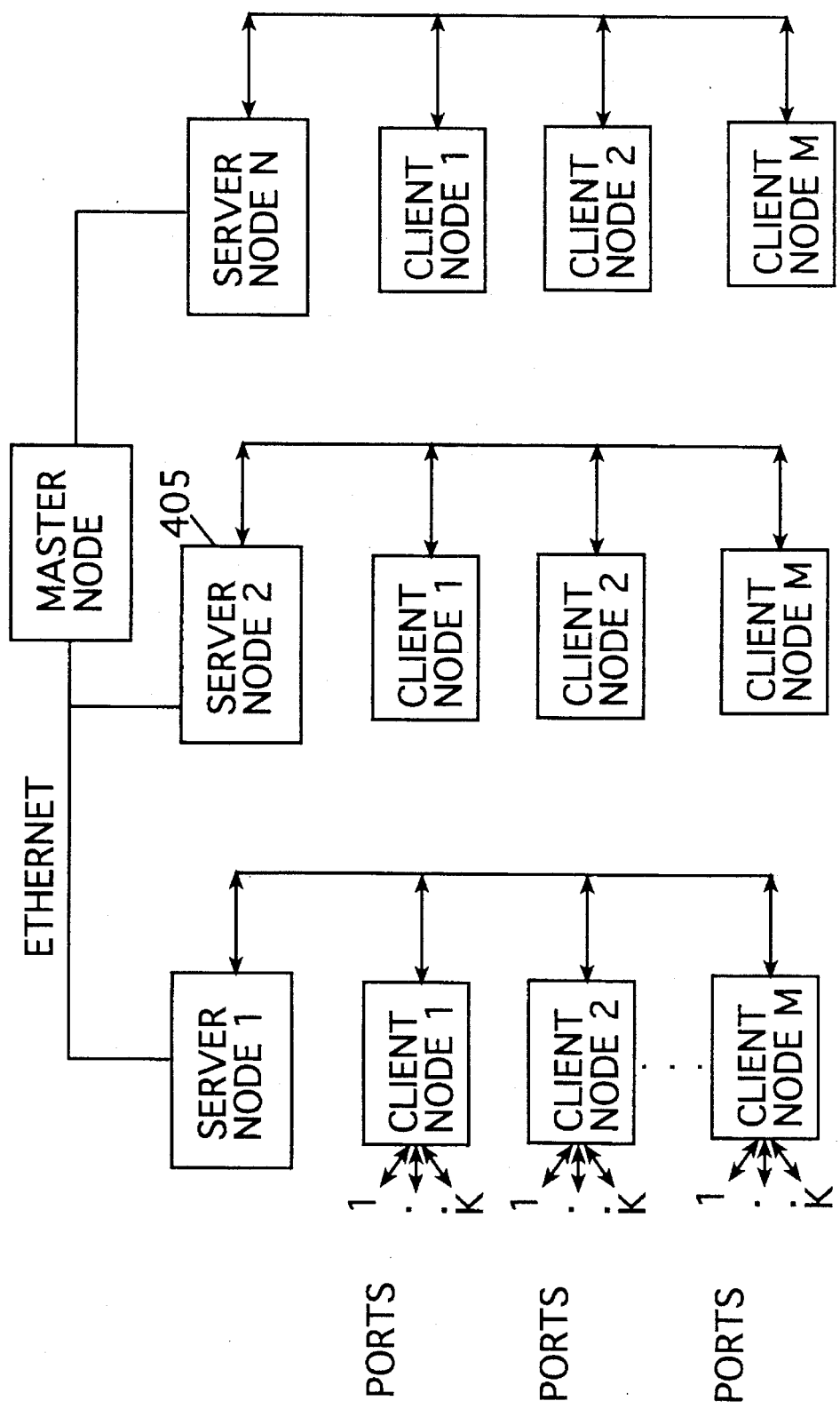
FIG. 8 is a block representation of the multimedia call processing system (MCPS) in accordance with the present invention.

The optimized multimedia information from the program source material is then processed by the MCPS 44 (FIG. 2) to be utilized interactively with IMDs 52. Referring now to FIG. 8, what is shown is the preferred embodiment of a MCPS 44. The MCPS comprises a distributed computing architecture 500. The distributed computing architecture 500 includes a master node 502 that has several server nodes 504 which in turn are connected to several ports 506.

When connected via the existing networks such as to a switched telephone network and then on to connection to the IMD which has its own processing storage and computing structure the entire network can be operated as a massive distributed computing environment. This environment shares all dimensions of computing, storage, transmission and peripheral resources (printing, product ordering, mailing functions, etc.). This type of computing architecture would include dynamic port allocation and would include incremental failure characteristics to allow for robustness of the MCPS 44.

It also is very important in any of the above-mentioned entertainment systems to have an interactive multimedia device 52 which will allow for the receipt of high quality multimedia information from IMM 42.

Figure 9:
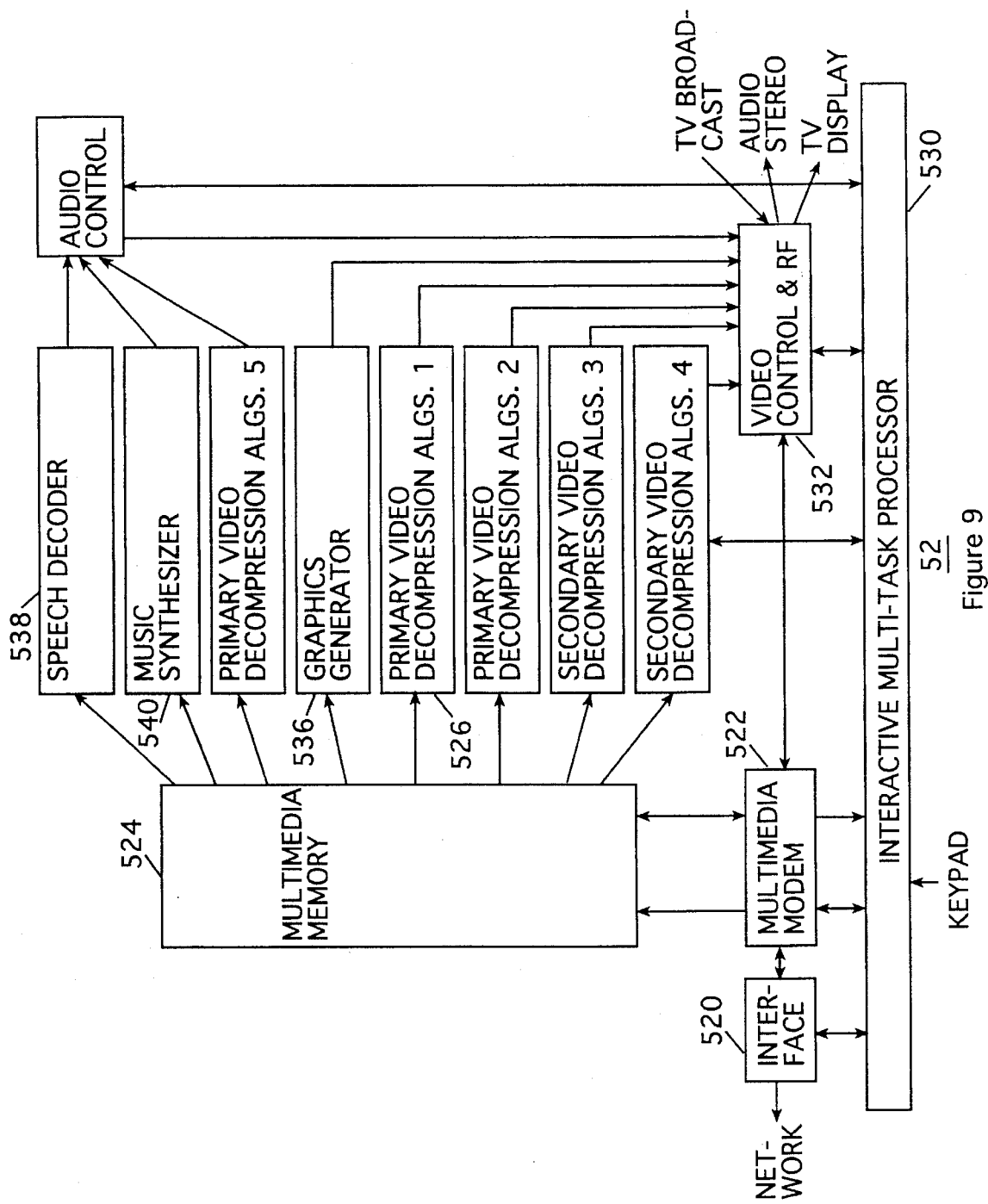
FIG. 9 is a block representation of an interactive multimedia device in accordance with the present invention.

FIG. 9 is a preferred embodiment of an interactive multimedia decoder (IMD) 52A. The IMD 52A comprises several components. The telephone line is coupled to a multimedia modem 522. The multimedia modem is coupled to a multimedia memory 524 which can be an expandable dynamic random access memory (DRAM) 524. The multimedia modem chip 522 provides data to a multimedia decompressor device 526. The multimedia memory provides data to graphics/character generator 536, speech generator 538 and music synthesizer 540.

In addition, the output of the generators 536, 538 and 540 are provided to a video control chip 532. Video control 532 provides signals to a standard television display and receives signals from a standard television source. The multimedia modem 532, the multimedia memory 524, the multimedia decompressor 526, the multimedia digital/audio control 528, the video control 532 and music synthesizer 544 are all ultimately controlled by an interactive control interface 530 which manages the operation of all of the above elements. The video control 528 is coupled to a standard telephone keypad input or for a television remote-type device or a special IMD remote can be utilized in a variety of ways which will be discussed in detail hereinafter.

Personalized and demographic information (such as the age, race, sex and other personal characteristics) of the user can be stored along with the technical information associated with the IMD 52 (serial no., number of generators, type etc.). Upon connecting the IMD 52 to the MCPS 44, the IMD 52 can both forward this information either at the beginning of the session or any time afterward. The information can then be updated through the MCPS 44 or directly IMD 52 through selection using a keypad or remote control or by receiving data from the MCPS 44.

Another mode of operation is the delivery of multimedia during the period when a communication network is not in use. In this way, large amounts of multimedia information can be efficiently transmitted and stored in the IMD 52 for later review and enhanced interactivity.

The function of each of the different components in a preferred embodiment is described in a summary fashion below.

Multimedia Modem 522

A. Responsible for all communications between standard phone line, optional serial port, interface to multimedia memory, multimedia decode, audio control, and processor control modules.

B. Supports standards protocol for half-duplex, full duplex, and half-duplex high speed operation.

C. On-chip encode/decode capability, D/A, A/D for voice, facsimile, and data functions.

D. Dual tone multi-frequency (DTMF) detect and generation.

E. Auto-detect voice/facsimile/data switch for transparent mode transition.

F. Incorporates controller unit with binary file transfer, facsimile, data, and voice modes, and optional proprietary multimedia processor control optimized protocol firmware.

G. Firmware allows IMD to use multimedia modem to perform call processing function including telephone call dialing and connection, unattended receipt of data and fax among other functions.

Multimedia Memory 524

A. Nominal DRAM or VRAM for image mixing/processing, and auxiliary multimedia data store.

B. Nominal ROM for resident IMD control program.

C. Optional co-resident DRAM for multimedia data store and program/data store.

D. Optional non-volatile storage (extendible).

E. Memory control unit for VRAM/ROM/DRAM and non-volatile storage.

Multimedia Decode 526

A. Responsible for real-time decompression of images transferred to or stored in the IMD 52.

B. On chip inverse discrete cosine transform processor with multiple algorithm coding.

C. Reverse quantizer decoder/tables.

D. Built-in zoom, pan, chroma key, mix from compressed data incorporates interfaces to video data bus, multimedia memory, multimedia modem, video control, and microprocessor control sections.

Video Control 532

A. Responsible for all IMD 52 video mixing, enhancements, and display functions.

B. Pixel processor for mix, zoom, pan, chroma key, transform on pixel data, transitions.

C. Graphics processor for figures (e.g., rectangles with color fill) generation, sprites, text with foreign characters, and scrolling.

D. Digital to analog conversion, analog to NTSC, NTSC video plus stereo audio to RF.

Graphics/Character, Speech Generator, Music Synthesizer 536, 538 and 540

A. Responsible for enhancing received analog/digital audio, music synthesis generation, and overall analog mixing and audio effects.

B. Incorporates decoding burden.

C. Sampled instrument synthesis from compressed MIDI input.

D. Built-in micro-controller for multi-task generation.

E. Dual analog source mix, digital audio and synthesizer mix, analog audio control (volume, bass, treble, balance) for output to analog left/right audio.

Interactive Multi-Task Processor 530

A. Responsible for multi-task execution of resident and downloaded IMD code for operation in conjunction or independently of the MCPS.

B. Master/slave microcontroller architecture for multi-task control of communications, multimedia memory, multimedia decode, digital video control, digital audio/synthesis, and interface management.

Through the cooperation of the IMM 42, IMD 52 and MCPS 44, an enhanced multimedia entertainment system is provided. These devices when connected either through a network or with a television or stereo equipment provide for the presentation of multimedia information that has enhanced quality as well as improved interactivity. In addition, this type of system will provide the facility to generate revenues and track the characteristics of individuals who are the users of the program source material (songs and videos).

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

I claim:

1. An interactive music listening entertainment system comprising:

means for storing a plurality of songs;

means for selecting one of the plurality of songs from the storing means;

means for transmitting the one song down a network; and means responsive to the selecting means for receiving the one song from the storing means by a recipient; the receiving means also receiving information concerning the cost of the one song from the storing means and including means for limiting the number of plays for the one song based on the encoding of the one song by the receiving means.

2. The system of claim 1 which further comprises: means coupled to the storing means for interactively selectively recording particular songs from the plurality of songs.

3. The system of claim 1 in which the receiving means is linked to ordering the one song.

4. An interactive multimedia video entertainment system comprising:

means for storing a plurality of songs and video information related to the plurality of songs;

means for selecting a song and its associated video information from the storing means;

means responsive to the selecting means for transmitting the one song and its associated video information down a network; and means responsive to the selecting means for receiving the one song and its associated video information, the receiving means also for receiving information concerning the cost of the one song and its associated video information from the storing means, for encoding the one song and its associated video information to limit the number of plays, and for counting the number of times the one song is played and charging the recipient a particular price per play.

5. The system of claim 4 in which the receiving means is linked to ordering the one song and its associated video information.

6. The system of claim 4 which further comprises means coupled to the storing means for interactively selectively recording particular songs and their associated video information.

7. An interactive multimedia karaoke system comprising:

means for storing multimedia information to allow for the production of a video and audio presentation, the video and audio presentation having multiple music tracks and multiple vocal tracks;

means for selecting a particular set of multimedia information from the storing means;

means for transmitting the particular set of multimedia information; and means responsive to the selecting and transmitting means for receiving the particular set of multimedia information and for substituting for at least one of the music tracks as well as multiple vocal tracks so as enhance the quality and interactivity of the particular set of multimedia information and for encoding the multimedia information to limit the number of plays of the multimedia information.

8. A multimedia Karaoke entertainment system comprising:

a plurality of monitors for a plurality of entertainment instruments or vocal tracks, each monitor related to one entertainment instrument or vocal track, each of the entertainment instruments and vocal tracks being related to a track of multimedia information;

a plurality of video cameras coupled to the monitor, each camera related to one entertainment instrument;

means for providing the same multimedia presentation to each of the plurality of monitors; and means for interactively substituting at least one track from the plurality of entertainment instruments or vocal tracks with one of the tracks of multimedia information.

9. The Karaoke entertainment system of claim 8 in which the substituting means enhances at least one track of the entertainment instruments or vocal tracks.

10. The Karaoke entertainment system of claim 9 in which at least one of the entertainment instruments is a MIDI guitar.

11. The Karaoke entertainment system of claim 10 in which at least one of the entertainment instruments is a MIDI drum.

12. The system of claim 8 in which comprises means for substituting for at least one of tracks with an image from one of the video cameras.

13. The system of claim 17 which include color keying the video information to each one of the performers utilizing the entertainment instruments or vocal tracks.

14. The system of claim 13 which includes color keying the video cameras to create an interactive display output.

15. The system of claim 14 in which the color key is substituted for the source program material to produce an enhanced interactive multimedia video production.

16. An multimedia Karaoke information entertainment system comprising:

interactive multimedia mastering system (IMM) for receiving program source material from a network;

an interactive multimedia device (IMD) for storing program source material received from the IMM and that can select certain program source material from the IMM; and multimedia call processing system (MCPS) that can receive credit or purchase information and can retrieve program source material to be sent to the IMD.

17. The system of claim 16 in which the IMD comprises a music synthesizer and at least one multimedia decompression means which receive analog information and digital information from the MCPS including compressed MIDI data representing the program source material.

18. The system of claim 16 in which the IMD comprises a music synthesizer and a key coding means which receive analog and digital information from the MCPS including compressed MIDI data representing the program source material.

19. The system of claim 17 in which the multimedia decompression means is a video decompression algorithm.

20. The system of claim 16 in which the MCPS sends the actual program source material over the network.

21. The system of claim 17 in which the MCPS send a purchase information over the network.

22. The system of claim 18 which further comprises means for utilizing the IMD to select individual program source material for compilation by the MCPS into a personalized set of program source material which is then transmitted down the network to the IMD.

23. The system of claim 18 which further comprises means for utilizing a telephone handset to select individual program source material for compilation by the MCPS into a personalized set of program source material which is then delivered to a user.

24. The system of claim 19 in which the program source material is a song.

25. The system of claim 19 which further includes a television and stereo coupled to the IMD for displaying audio and video program source material from both the stored information in the IMD and from the information within the 26. The system of claim 25 in which the vocals and entertainment instruments are separated into separate music and video tracks; the music tracks being distinct analog audio, digital audio and MIDI data tracks and the video tracks being analog video, digital video, compressed video and keyed program source information.

27. The system of claim 26 in which further comprises means for substituting tracks for the tracks associated with the program source material to allow for teaching.

28. The system of claim 27 in which includes means for presenting the program source material such that when placed on a program monitor it is keyed to a color change to allow a user to highlight the position of the material to the user.

29. The system of claim 28 which includes means for presenting musical notation associated with an individual track that is superimposed on a video monitor such that when there is a color change the current position of the music will be highlighted.

\* \* \* \* \*

(12) EX PARTE REEXAMINATION CERTIFICATE (10233rd)
United States Patent
Lewis

(10) Number: US 5,464,946 C1
(45) Certificate Issued: Jul. 28, 2014

(54) SYSTEM AND APPARATUS FOR INTERACTIVE MULTIMEDIA ENTERTAINMENT

(75) Inventor: Scott W. Lewis, San Jose, CA (US)

(73) Assignee: 1st Media LLC, Los Gatos, CA (US)

Reexamination Request:
No. 90/012,695, Sep. 24, 2012

Reexamination Certificate for:
Patent No.: 5,464,946
Issued: Nov. 7, 1995
Appl. No.: 07/977,033
Filed: Feb. 11, 1993

(51) Int. Cl.
*G10H 1/36* (2006.01)
*G09B 15/00* (2006.01)

(52) U.S. Cl.
USPC .............................. 84/609; 84/477 R; 84/645

(58) Field of Classification Search
None
See application file for complete search history.

(56) References Cited

To view the complete listing of prior art documents cited during the proceeding for Reexamination Control Number 90/012,695, please refer to the USPTO's public Patent Application Information Retrieval (PAIR) system under the Display References tab.

*Primary Examiner* — William H Wood

(57) ABSTRACT

A system for interactive multimedia entertainment that stores a plurality of video and/or songs and allows for the receipt of information concerning the cost of each song and other relevant information. The system has application to music listening, video entertainment and Karaoke entertainment systems.

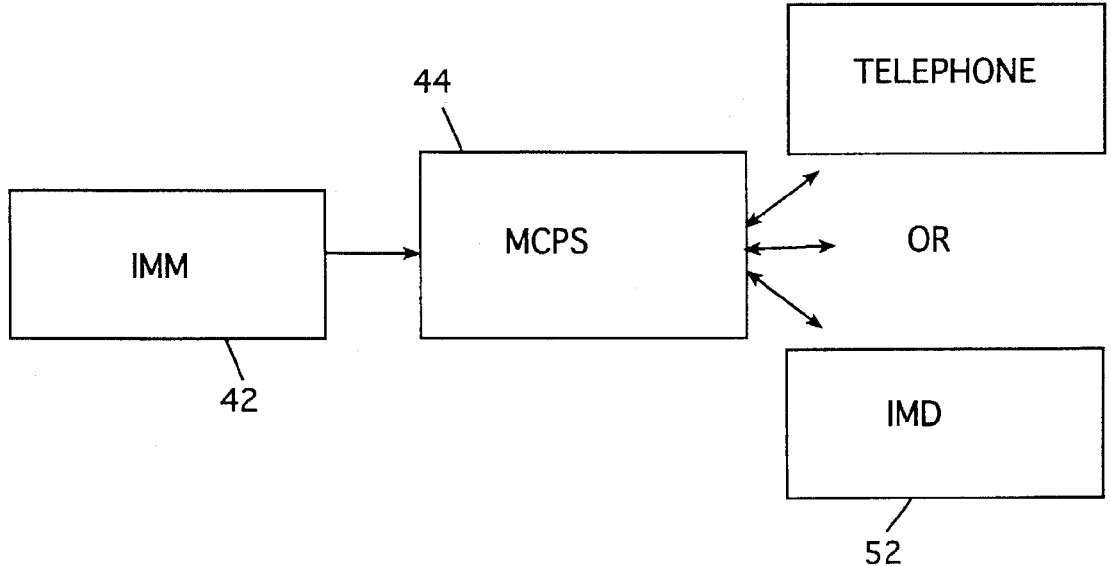

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 16, 17, 19-21, 24 and 25 are cancelled.

Claims 1-15, 18, 22, 23 and 26-29 were not reexamined.

* * * * *